United States Patent
Doi et al.

(10) Patent No.: US 10,407,543 B2
(45) Date of Patent: Sep. 10, 2019

(54) METHOD FOR PRODUCING POLYETHYLENE GLYCOL HAVING TERMINAL CARBOXYL GROUP

(71) Applicant: NOF CORPORATION, Tokyo (JP)

(72) Inventors: Akiko Doi, Kawasaki (JP); Takashi Ichikawa, Kawasaki (JP); Tsuyoshi Takehana, Kawasaki (JP); Takuma Tsubusaki, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 0 days.

(21) Appl. No.: 15/770,680

(22) PCT Filed: Nov. 17, 2016

(86) PCT No.: PCT/JP2016/084166
§ 371 (c)(1),
(2) Date: Apr. 24, 2018

(87) PCT Pub. No.: WO2017/086402
PCT Pub. Date: May 26, 2017

(65) Prior Publication Data
US 2019/0055353 A1    Feb. 21, 2019

(30) Foreign Application Priority Data
Nov. 20, 2015   (JP) ................. 2015-227812

(51) Int. Cl.
*C08G 65/326*   (2006.01)
*C08G 65/332*   (2006.01)

(52) U.S. Cl.
CPC ....... *C08G 65/3322* (2013.01); *C08G 65/326* (2013.01)

(58) Field of Classification Search
CPC .............. C08G 65/324; C08G 65/326
See application file for complete search history.

(56) References Cited

U.S. PATENT DOCUMENTS

| | | | | |
|---|---|---|---|---|
| 5,523,479 A * | 6/1996 | Sanders | ............... | C07C 51/367 560/180 |
| 5,681,567 A | 10/1997 | Martinez et al. | | |
| 6,465,694 B1 * | 10/2002 | Baudys | ............... | C07C 45/38 568/41 |
| 2002/0072600 A1 * | 6/2002 | Bragd | ............... | C07C 45/29 536/56 |
| 2005/0036978 A1 * | 2/2005 | Kozlowski | ........... | A61K 9/1611 424/78.17 |
| 2005/0171291 A1 | 8/2005 | Kozlowski et al. | | |
| 2009/0264600 A1 | 10/2009 | Kozlowski | | |
| 2010/0004428 A1 | 1/2010 | Kozlowski et al. | | |
| 2012/0209027 A1 | 8/2012 | Kozlowski | | |
| 2013/0231490 A1 | 9/2013 | Kozlowski | | |
| 2014/0296541 A1 | 10/2014 | Kozlowski | | |

FOREIGN PATENT DOCUMENTS

| | | |
|---|---|---|
| JP | 2005-538226 A | 12/2005 |
| JP | 2007-538111 A | 12/2007 |
| WO | 2004/022629 A2 | 3/2004 |
| WO | 2005/070973 A2 | 8/2005 |
| WO | 2015/041322 A1 | 3/2015 |

OTHER PUBLICATIONS

Travis, Organic Letters, vol. 5, No. 7, 2003, p. 1031-1034 (Year: 2003).*
Guastavino, J., et al., "Simple Synthesis of Aldehyde and Carboxylic Acid Terminated Methoxypoly(ethylene glycol)", Aug. 2016, Macromolecular Chemistry and Physics, vol. 27, Issue 15, pp. 1745-1751.
Search Report dated Jan. 24, 2017, issued by the International Searching Authority in counterpart International Patent Application No. PCT/JP2016/084166 (PCT/ISA/210).
Written Opinion dated Jan. 27, 2017, issued by the International Searching Authority in counterpart International Patent Application No. PCT/JP2016/084166 (PCT/ISA/237).
Communication dated May 14, 2019, from the European Patent Office in counterpart European Application No. 16866403.5.

* cited by examiner

*Primary Examiner* — Robert C Boyle
(74) *Attorney, Agent, or Firm* — Sughrue Mion, PLLC

(57) ABSTRACT

A method for producing polyethylene glycol having a terminal carboxyl group including oxidizing polyethylene glycol represented by formula (I): $CH_3O(CH_2CH_2O)_n(CH_2)_m$—CHO with potassium peroxymonosulfate in water whose pH is adjusted to be from 6 to 8 with at least one selected from a carbonate, a phosphate, a citrate and an acetate at 5 to 40° C. to produce polyethylene glycol represented by formula (II): $CH_3O(CH_2CH_2O)_n(CH_2)_m$—COOH, wherein n is a number from 10 to 1,100, and m is 2 or 3.

2 Claims, No Drawings

METHOD FOR PRODUCING POLYETHYLENE GLYCOL HAVING TERMINAL CARBOXYL GROUP

CROSS REFERENCE TO RELATED APPLICATIONS

This application is a National Stage of International Application No. PCT/JP2016/084166, filed on Nov. 17, 2016, which claims priority from Japanese Patent Application No. 2015-227812, filed on Nov. 20, 2015.

TECHNICAL FIELD

The present invention relates to a method for producing polyethylene glycol having a terminal carboxyl group.

BACKGROUND ART

In recent years, development of pharmaceuticals using a mediator, for example, hormone, or a physiologically active substance, for example, an antibody or an enzyme, as a drug has been actively conducted. When these substances are administered into the body, since they are subjected to phagocytosis by the reticuloendothelial system and excretion in kidney and eliminated from the body, circulation in blood is low and sufficient drug efficacy is hardly obtained. Therefore, attempts to improve the circulation of drug in blood have been made by modifying the drug with a water-soluble polymer such as a saccharide or polyethylene glycol (PEG). It is known that the modification with polyethylene glycol reduces the immunogenicity and antigenicity of the drug while maintaining the stability of the drug. In order to increase the uniformity of the drug (particularly, in order to suppress variations of the circulation of drug in blood, immunogenicity, drug efficacy and the like), it is necessary to use a PEG modifier having a small polydispersity (weight average molecular weight (Mw)/number average molecular weight (Mn)). Up to now, PEGylated interferon and PEGylated preparation, for example, PEGylated hrGCSF, come onto the market and the usefulness of PEGylated technology becomes clear.

In order to modify a physiologically active substance, for example, a protein or an enzyme, with polyethylene glycol, it is necessary to convert a terminal hydroxyl group of polyethylene glycol to a reactive functional group. In the conversion to a reactive functional group, the remaining of an unreacted hydroxyl group causes byproduct of a high molecular weight PEG impurity, a PEGylated preparation having a different bonding and the like. Therefore, it is preferred that the conversion rate from a hydroxyl group to the reactive functional group is high.

It has particularly high usefulness to convert a terminal hydroxyl group of polyethylene glycol to a terminal carboxyl group. For example, the polyethylene glycol having a terminal carboxyl group can be converted to a succinimidyl ester, which is an active ester, by using a condensing agent, for example, N-hydroxysuccinimide and dicyclohexylcarbodiimide. Since the succinimidyl ester reacts with a primary amine under near physiological conditions to from a stable amide, it is most used as an acylating agent for protein modification. Of the succinimidyl esters, succinimidyl propionate and succinimidyl butanoate are relatively stable in an aqueous solution while exhibiting an appropriate reactivity to an amino group of protein or a physiologically active substance so that they are particularly useful for the modification of physiologically active substance.

As to the conversion of terminal hydroxyl group of polyethylene glycol to a terminal carboxyl group, several reports have heretofore been made. For example, in Patent Document 1 (particularly, Claim 1 thereof), a method of producing a carboxylic acid including allowing to react a polyhydric alcohol represented by formula: $Q(OH)_{x+y}$ with a carboxylic acid represented by formula: $CH(R')=C(R'')-COOR'''$, and then hydrolyzing the resulting product is described (definitions in the formulae are same as those described in Patent Document 1).

Further, in Patent Document 2 (particularly, Claim 1 thereof), a method of producing a water-soluble non-peptidic polymer having a carboxyl group including allowing to react a water-soluble non-peptidic polymer having at least one hydroxyl group with a tertiary alkyl acrylate to form an ester of the polymer and then treating the ester of the polymer with a strong acid is described.

However, in the production methods described in Patent Documents 1 and 2, there is a problem in that a conversion rate of a hydroxyl group to a carboxyl group is less than 85% and is not so high. Specifically, in the examples of Document 1, the conversion rate is from 31.9 to 84.7%, and in the examples of Document 2, the conversion rate is from 69.1 to 73.8%. In the case where purity of pharmaceutical grade is required, it is necessary to separate a polymer having a terminal carboxyl group as the product from a polymer having a terminal hydroxyl group as the unreacted substance by ion exchange or reverse phase HPLC. Moreover, the production methods described in Patent Documents 1 and 2 have a problem in that the reactions require a long period of time.

In Patent Document 3 (particularly, Claim 19 thereof), a method of producing a carboxylic acid of water-soluble polymer including (a) step of allowing to react a water-soluble polymer segment having at least one alkoxide ion or thiolate ion with an ortho ester having a suitable leaving group to form an ortho ester of the water-soluble polymer, and (b) step of being subjected the ortho ester of the water-soluble polymer formed in step (a) to at least one hydrolysis step to obtain a carboxylic acid of the corresponding water-soluble polymer is described. However, in the production method described in Patent Document 3, there is a problem in that an expensive reagent, for example, trimethyl 4-bromoorthobutyrate, is used. Moreover, there is a problem in that in the synthesis of the ortho ester used in the production method described in Patent Document 3 a multi-stage step is required.

Furthermore, as a method of forming a terminal carboxyl group, oxidation of a terminal hydroxyl group (that is, oxidation of an alcohol) is exemplified. As a method of producing a carboxylic acid by oxidizing an alcohol, a method using a strong acid or a heavy metal compound (for example, chromium compound) is known. However, in Jones oxidation which is known as a typical oxidation method of an alcohol, a highly toxic chromium compound is used. Therefore, in the case where a compound used for pharmaceutical is produced by Jones oxidation in order to remove the chromium compound, there is a problem in that purification with high precision is required.

PRIOR ART DOCUMENTS

Patent Documents

Patent Document 1: U.S. Pat. No. 5,523,479
Patent Document 2: Japanese Translation of PCT International Application Publication No. JP-T-2007-538111

Patent Document 3: Japanese Translation of PCT International Application Publication No. JP-T-2005-538226

SUMMARY OF THE INVENTION

Problems that the Invention is to Solve

As a result of the investigations on production of polyethylene glycol having a terminal carboxyl group useful for the modification of drug, the inventors have found that when a polyethylene glycol having a terminal hydroxyl group is oxidized by using a strong oxidizing agent, a problem arises in that the polyethylene glycol chain is degraded by oxidation to increase its polydispersity.

The present invention has been made in view of the circumstances described above, and an object of the invention is to provide a method for producing polyethylene glycol having a terminal carboxyl group in which an expensive reagent, for example, trimethyl 4-bromoorthobutyrate, or a highly toxic heavy metal compound is not used and which can suppress increase in polydispersity.

Means for Solving the Problems

As a result of the intensive investigations to achieve the object described above, the inventors have found that by using, as a starting material, not a polyethylene glycol having a terminal hydroxyl group but a methoxy polyethylene glycol having a terminal formyl group, and oxidizing the polyethylene glycol having a terminal formyl group with potassium peroxymonosulfate in water adjusted to a specific pH, the oxidative degradation of polyethylene glycol chain is suppressed and a terminal formyl group is able to be efficiently converted to a terminal carboxyl group. The present invention based on the finding is as follows.

[1] A method for producing polyethylene glycol having a terminal carboxyl group, including oxidizing polyethylene glycol represented by formula (I) with potassium peroxymonosulfate in water whose pH is adjusted to be from 6 to 8 with at least one selected from the group consisting of a carbonate, a phosphate, a citrate and an acetate at 5 to 40° C. to produce polyethylene glycol represented by formula (II):

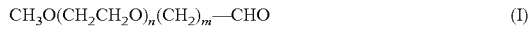

(in the formula, n is a number from 10 to 1,100, and m is 2 or 3);

(in the formula, n and m have the same meanings as defined above.)

[2] The production method as recited in [1], wherein an amount of the potassium peroxymonosulfate is from 1.5 to 4 moles with respect to one mole of the polyethylene glycol represented by formula (I).

Effect of the Invention

According to the invention, a methoxy polyethylene glycol having a terminal carboxyl group can be produced with a high carboxylation rate while suppressing the increase in polydispersity. The polyethylene glycol thus obtained can be expected to be used in modification of drug without the need for special purification step, for example, ion exchange or reverse phase HPLC. Here, the carboxylation rate means a proportion of polyethylene glycol represented by formula (II) contained in a reaction product obtained by an oxidation reaction from the formyl group to a carboxyl group, and the carboxylation rate is obtained by calculating an area percentage of the main peak from an area value of each peak in a chromatogram obtained by HPLC analysis.

MODE FOR CARRYING OUT THE INVENTION

One of the features of the invention is to produce a methoxy polyethylene glycol having a terminal carboxyl group from a methoxy polyethylene glycol having a terminal formyl group. Here, the methoxy polyethylene glycol having a terminal formyl group and the methoxy polyethylene glycol having a terminal carboxyl group mean polyethylene glycol having a methoxy group at one terminal of the main chain and a formyl group or a carboxyl group at the other terminal of the main chain, respectively.

One of the features of the invention is to produce polyethylene glycol represented by formula (II) (hereinafter, may be abbreviated as "polyethylene glycol (II)") by oxidizing polyethylene glycol represented by formula (I) (hereinafter, may be abbreviated as "polyethylene glycol (I)").

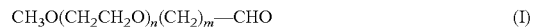

(in the formula, n is a number from 10 to 1,100, and m is 2 or 3)

(in the formula, n and m have the same meanings as defined above.)

The weight average molecular weight (Mw) of polyethylene glycol (I) which is used in the invention is preferably from 395 to 53,240, and more preferably from 1,780 to 36,300.

n is a number from 10 to 1,100, and preferably a number from 45 to 750. m is 2 or 3, and preferably 2. Polyethylene glycol (II) wherein m is 2 has an appropriate reactivity to an amino group of protein or a physiologically active substance in comparison with polyethylene glycol (II) wherein m is 3. Polyethylene glycol (II) wherein m is 1, when it is converted to an active ester, for example, succinimidyl, the ester has high reactivity, is easily hydrolyzed and causes difficulty in handling. On the other hand, polyethylene glycol (II) wherein m is 4 or more has a possibility of decreasing reactivity with a protein or a physiologically active substance.

Polyethylene glycol (I) for use in the invention is commercially available and can be purchased, for example, from NOF Corp.

One of the features of the invention is to oxidize polyethylene glycol (I) with potassium peroxymonosulfate in water. By using potassium peroxymonosulfate, the oxidative degradation of polyethylene glycol chain can be suppressed, thereby suppressing the increase in polydispersity of polyethylene glycol (II) obtained. The use amount of potassium peroxymonosulfate is preferably 1.5 moles or more, more preferably from 1.5 to 4 moles, still more preferably from 1.5 to 2 moles, with respect to one mole of polyethylene glycol (I) from the standpoint of reactivity and economy.

As a source of potassium peroxymonosulfate, it is preferred to use a double salt of potassium peroxymonosulfate, potassium hydrogen sulfate and potassium sulfate (for example, $2KHSO_5 \cdot KHSO_4 \cdot K_2SO_4$). The double salt can be obtained from Tokyo Chemical Industry Co., Ltd.

Oxidation temperature (that is, temperature of a reaction solution containing polyethylene glycol (I), potassium peroxymonosulfate and water) is from 5 to 40° C., preferably from 5 to 25° C., from the standpoint of reaction rate of the oxidation and suppression of the oxidative degradation of polyethylene glycol chain. Reaction time of the oxidation is preferably from 1 to 24 hours, and more preferably from 1 to 5 hours.

The invention is characterized by performing the oxidation described above in water. When the oxidation is performed in an organic solvent, for example, N,N-dimethylformamide (DMF), there is a possibility that the oxidative degradation of polyethylene glycol chain may occur.

pH of the water is from 6 to 8, preferably from 7 to 8, from the standpoint of acceleration of oxidation and suppression of a side reaction (for example, aldol condensation).

One of the features of the invention is to adjust the pH of water by at least one selected from the group consisting of a carbonate, a phosphate, a citrate and an acetate. The carbonate, phosphate, citrate and acetate are not particularly limited as long as they are able to adjust pH of the reaction solution to 6 to 8 (preferably 7 to 8). The carbonate includes, for example, sodium hydrogen carbonate and potassium hydrogen carbonate. The phosphate includes, for example, sodium hydrogen phosphate and potassium hydrogen phosphate. The citrate includes, for example, trisodium citrate and tripotassium citrate. The acetate includes, for example, sodium acetate and potassium acetate. Of these, sodium hydrogen carbonate, potassium hydrogen carbonate, sodium hydrogen phosphate and potassium hydrogen phosphate are preferred.

Polyethylene glycol (I), potassium peroxymonosulfate and a carbonate or the like may be added to water at the same time or separately. In the case where they are added separately, the order of the addition is nor particularly limited and it is preferred that polyethylene glycol (I) is dissolved in water to obtain a solution of polyethylene glycol (I) and then potassium peroxymonosulfate and a carbonate or the like are added thereto.

It is preferred that potassium peroxymonosulfate and a carbonate or the like are added to the solution of polyethylene glycol (I) according to the method described below. First, potassium peroxymonosulfate is dissolved in water to obtain a solution of potassium peroxymonosulfate. Then, to the resulting solution is added solid carbonate or the like or a solution of carbonate or the like prepared by dissolving the carbonate or the like in water to obtain a solution of potassium peroxymonosulfate and a carbonate or the like. Subsequently, the resulting solution is added to the solution of polyethylene glycol (I).

Additionally, in the case where a double salt of potassium peroxymonosulfate is mixed with a carbonate, there is a possibility that an acidic salt included in the double salt reacts with the carbonate so that carbon dioxide is rapidly generated. Therefore, in the case where a double salt of potassium peroxymonosulfate and a carbonate are used, it is desired that a solution of carbonate is dropwise added to a solution of double salt previously prepared.

In the case where polyethylene glycol (I), potassium peroxymonosulfate and a carbonate are added to water at the same time, the amount of water is preferably 0.5 times by weight or more, more preferably from 5 to 20 times by weight, of polyethylene glycol (I)

In the case where polyethylene glycol (I), potassium peroxymonosulfate and a carbonate or the like are added separately to water, an amount of water used for dissolving potassium peroxymonosulfate is preferably 0.2 times by weight or more, more preferably from 2 to 10 times by weight, of the amount of polyethylene glycol (I), an amount of water used for dissolving a carbonate or the like is preferably 0.2 times by weight or more, more preferably from 2 to 10 times by weight, of the amount of polyethylene glycol (I), and an amount of water used for dissolving polyethylene glycol (I) is preferably 0.1 times by weight or more, more preferably from 2 to 10 times by weight, of the amount of polyethylene glycol (I).

In the case where an aqueous solution of potassium peroxymonosulfate and a carbonate or the like is added to an aqueous solution of polyethylene glycol (I), the addition temperature (that is, temperature of each solution) is preferably from 5 to 40° C., and more preferably from 5 to 25° C.

In order to suppress decomposition of potassium peroxymonosulfate, a chelating agent may be used. In the case of using a chelating agent, the amount thereof is preferably from $3 \times 10^{-2}$ to $7 \times 10^{-2}$ mol with respect to 1 mol of potassium peroxymonosulfate. As the chelating agent, an aminocarboxylic acid chelating agent, for example, ethylenediaminetetraacetic acid, hydroxyethylethylenediaminetriacetic acid, diethylenetriaminepentaacetic acid, triethylenetetraminehexaacetic acid or nitrilotriacetic acid. In the case of using the chelating agent, it is preferred that the chelating agent is added to the solution of potassium peroxymonosulfate.

After the completion of the oxidation, it is preferred to quench the unreacted potassium peroxymonosulfate with a reducing agent, for example, sodium ascorbate, sodium thiosulfate, sodium hydrogen sulfite or sodium sulfite. Then, polyethylene glycol (II) can be extracted by using an extraction solvent, for example, chloroform or dichloromethane. Since potassium peroxymonosulfate and a carbonate or the like remain in water by the extraction, only polyethylene glycol (II) can be selectively extracted. In the case where polyethylene glycol (II) is hard to migrate into an organic layer at the extraction, after quenching potassium peroxymonosulfate with a reducing agent, pH of the reaction solution is adjusted to 2 to 4 by using an acid, for example, phosphoric acid or hydrochloric acid, and then the extraction may be performed.

Temperature at the extraction is preferably from 5 to 40° C., and more preferably from 5 to 25° C. When the temperature is less than 5° C., the salts in the reaction solution are liable to deposit. When the temperature exceeds 40° C., since chloroform or dichloromethane used as the extraction solvent is vaporized, it is not preferred from the standpoint of safety.

The organic layer obtained by the extraction is concentrated at approximately 40° C., the resulting concentrate is dissolved in ethyl acetate, and hexane is added to the resulting ethyl acetate solution to deposit polyethylene glycol (II), followed by performing filtration and drying, thereby obtaining polyethylene glycol (II). In order to remove water mixed from the aqueous layer at the extraction, a dehydration operation may be performed before or after the concentration. Furthermore, the polyethylene glycol (II) obtained may be purified with an adsorbent or the like.

According to the production method of the invention described above, high purity polyethylene glycol (II) is obtained with a high carboxylation rate while suppressing the increase in polydispersity. The polyethylene glycol (II) thus obtained is able to efficiently modify a drug so that it can be expected to increase uniformity of drug.

The polydispersity of the polyethylene glycol (II) obtained by the production method of the invention is preferably 1.08 or less. The polydispersity can be calculated from GPC analysis under the conditions described in the examples below.

The carboxylation rate in the production method of the invention is preferably 85% or more, and more preferably 90% or more. The carboxylation rate can be calculated from HPLC analysis under the conditions described in the examples below. Particularly, on a chromatogram obtained by HPLC analysis, when peaks are separated, they are divided by the minimum value between the peaks, or when the peaks are overlapped, they are divided at the inflection point between the peaks, and from area value of each peak obtained an area percentage of the main peak is calculated, whereby the carboxylation rate can be determined.

EXAMPLES

The invention will be described more specifically with reference to the examples. In addition, "%" below means "% by weigh" unless otherwise specified.

The polydispersity and carboxylation rate of the polyethylene glycol obtained in Examples 1 to 2 and Comparative Examples 1 to 3 are calculated by using liquid chromatography (GPC and HPLC). As a system of the liquid chromatography, Alliance produced by Waters Corp. was used.

The analysis conditions of GPC and HPLC are shown below.

GPC Analysis
  Detector: differential refractometer
  Column: Ultrahydrogel 500 and Ultrahydrogel 250 (Waters Corp.)
  Mobile phase: sodium acetate buffer (solvent: water, pH: 5.2)
  Flow rate: 0.5 ml/min
  Sample amount: 5 mg/mL, 20 μL
  Column temperature: 30° C.

HPLC Analysis
  Detector: differential refractometer
  Column: anion exchange column ES-502N (Asahipak)
  Mobile phase: ammonium formate buffer (solvent: water, pH: 8.0)
  Flow rate: 1.0 ml/min
  Injection volume: 10 mg/mL, 20 μL
  Column temperature: 30° C.

Example 1

Sodium hydrogen carbonate (0.27 g) was dissolved in ion-exchanged water (4.0 g) to obtain an aqueous sodium hydrogen carbonate solution. Next, a double salt of potassium peroxymonosulfate, potassium hydrogen sulfate and potassium sulfate (0.25 g, potassium peroxymonosulfate content in the double salt=45%, amount of potassium peroxymonosulfate with respect to 1 mol of methoxy polyethylene glycol having a terminal formyl group=1.8 mol, produced by Tokyo Chemical Industry Co., Ltd.) and ethylenediaminetetraacetic acid (5.5 mg, $1.9 \times 10^{-5}$ mol, produced by Kanto Chemical Co., Inc.) were stirred in ion-exchanged water (6.0 g). To the resulting suspension was dropwise added the aqueous sodium hydrogen carbonate solution to dissolve ethylenediaminetetraacetic acid, thereby obtaining an aqueous potassium peroxymonosulfate solution. Then, methoxy polyethylene glycol having a terminal formyl group (2.0 g, $4.0 \times 10^{-4}$ mol, weight average molecular weight=about 5,000, n=about 113, m=2 in formula (I), SUNBRIGHT ME-050AL produced by NOF Corp.) was dissolved in ion-exchanged water (10 g), to the resulting solution was dropwise added the aqueous potassium peroxymonosulfate solution under nitrogen atmosphere and temperature of 20 to 25° C. to prepare a reaction solution having pH of 7. The resulting reaction solution was stirred under nitrogen atmosphere and temperature of 23° C. for 2 hours. Then, 30% aqueous sodium ascorbate solution (0.32 g) was added to the reaction solution, the solution was stirred at 23° C. for 30 minutes, and 85% aqueous phosphoric acid solution (0.26 g) was added thereto to adjust pH of the reaction solution to 3. Then, the product was extracted with chloroform (20 g) from the reaction solution. The resulting extract phase (chloroform solution) was concentrated at 40° C., and to the resulting concentrate was added ethyl acetate (10 g). To the resulting ethyl acetate solution was added magnesium sulfate (0.2 g), the mixture was stirred at 35° C. for 30 minutes, and then subjected to suction filtration using a Kiriyama funnel lined with 5A filter paper. To the resulting filtrate was added hexane (10 g) to deposit the product. The deposit was subjected to suction filtration using 5A filter paper and dried in vacuo to obtain methoxy polyethylene glycol having a terminal carboxyl group (1.6 g).

Content of polyethylene glycol having a weight average molecular weight of 5,000 in the resulting polyethylene glycol=99.4%
Polydispersity of the resulting polyethylene glycol=1.05
Carboxylation rate=95% by mole Example 2

Sodium hydrogen carbonate (0.14 g) was dissolved in ion-exchanged water (2.0 g) to obtain an aqueous sodium hydrogen carbonate solution. Next, a double salt of potassium peroxymonosulfate, potassium hydrogen sulfate and potassium sulfate (18 mg, potassium peroxymonosulfate content in the double salt=45%, amount of potassium peroxymonosulfate with respect to 1 mol of methoxy polyethylene glycol having a terminal formyl group=1.6 mol, produced by Tokyo Chemical Industry Co., Ltd.) and ethylenediaminetetraacetic acid (0.4 mg, $1.3 \times 10^{-6}$ mol, produced by Kanto Chemical Co., Inc.) were stirred in ion-exchanged water (3.0 g). To the resulting suspension was dropwise added the aqueous sodium hydrogen carbonate solution to dissolve ethylenediaminetetraacetic acid, thereby obtaining an aqueous potassium peroxymonosulfate solution. Then, methoxy polyethylene glycol having a terminal formyl group (1.0 g, $3.3 \times 10^{-5}$ mol, weight average molecular weight=about 30,000, n=about 680, m=2 in formula (I), SUNBRIGHT ME-300AL produced by NOF Corp.) was dissolved in ion-exchanged water (5.0 g), to the resulting solution was dropwise added the aqueous potassium peroxymonosulfate solution under nitrogen atmosphere and temperature of 20 to 25° C. to prepare a reaction solution having pH of 8. The resulting reaction solution was stirred under nitrogen atmosphere and temperature of 23° C. for 2 hours. Then, 30% aqueous sodium ascorbate solution (20 mg) was added to the reaction solution, the solution was stirred at 21° C. for 30 minutes, and 85% aqueous phosphoric acid solution (0.19 g) was added thereto to adjust pH of the reaction solution to 3. Then, the product was extracted with chloroform (10 g) from the reaction solution. The resulting extract phase (chloroform solution) was concentrated at 40° C., and to the resulting concentrate was added ethyl acetate (5.0 g). To the resulting ethyl acetate solution was added magnesium sulfate (0.1 g), the mixture was stirred at 35° C. for 30 minutes, and then subjected to suction filtration using a Kiriyama funnel lined with 5A filter paper. To the resulting filtrate was added hexane (7.0 g) to deposit the product. The deposit was subjected to suction filtration using 5A filter paper and dried in vacuo to obtain methoxy polyethylene glycol having a terminal carboxyl group (0.79 g).

Content of polyethylene glycol having a weight average molecular weight of 30,000 in the resulting polyethylene glycol=98.4%

Polydispersity of the resulting polyethylene glycol=1.06

Carboxylation rate=91% by mole

Comparative Example 1

Methoxy polyethylene glycol having a terminal hydroxyl group (10 g, $2.0 \times 10^{-3}$ mol, weight average molecular weight=about 5,000, SUNBRIGHT MEH-50H produced by NOF Corp.) and tetrabutylammonium bromide (0.68 g) were dissolved in toluene (16 g), and the resulting solution was subjected to azeotropic dehydration at 115° C. to remove toluene (11 g) containing water. The solution after removal of toluene was cooled to 55 to 60° C., then potassium hydroxide (0.17 g) and tert-butyl acrylate (2.0 g) were added thereto, and the mixture was stirred under nitrogen atmosphere and temperature of 60° C. for 6 hours. Next, the resulting reaction solution was concentrated. The resulting concentrate was dissolved in dichloromethane (150 g) and the solution was washed twice with water (30 g). Then, to the dichloromethane solution was added magnesium sulfate (4.0 g), the mixture was stirred at 35° C. for 30 minutes, then subjected to suction filtration using a Kiriyama funnel lined with 5A filter paper, and the filtrate was concentrated. Then, the resulting concentrate was dissolved in dichloromethane/ trifluoroacetic acid solution (1:1 in volume ratio) (60 mL) and the resulting solution was stirred at 35° C. for one hour. The solution after stirring was diluted with dichloromethane (265 g) and washed with water (200 g). Then, to the dichloromethane solution was added magnesium sulfate (1.0 g), the mixture was stirred at 35° C. for 30 minutes, then subjected to suction filtration using a Kiriyama funnel lined with 5A filter paper, and the filtrate was concentrated. The resulting concentrate was dissolved in ethyl acetate (150 g), and to the resulting solution was added hexane (75 g) to deposit the product. The deposit was subjected to suction filtration using 5A filter paper, again dissolved in ethyl acetate (150 g), and hexane (75 g) was added thereto to deposit the product. The deposit was subjected to suction filtration using 5A filter paper, and dried in vacuo to obtain methoxy polyethylene glycol having a terminal carboxyl group (6.9 g).

Content of polyethylene glycol having a weight average molecular weight of 5,000 in the resulting polyethylene glycol=93.3%

Polydispersity of the resulting polyethylene glycol=1.09

Carboxylation rate=78% by mole

Comparative Example 2

Methoxy polyethylene glycol having a terminal formyl group (1.0 g, $4.0 \times 10^{-4}$ mol, weight average molecular weight=about 5,000, n=about 113, m=2 in formula (I), SUNBRIGHT ME-050AL produced by NOF Corp.) was dissolved in N,N-dimethylformamide (DMF, 2.8 g), to the resulting DMF solution was added a double salt of potassium peroxymonosulfate, potassium hydrogen sulfate and potassium sulfate (0.12 g, potassium peroxymonosulfate content in the double salt=45%, amount of potassium peroxymonosulfate with respect to 1 mol of methoxy polyethylene glycol having a terminal formyl group=1.8 mol, produced by Tokyo Chemical Industry Co., Ltd.), and the mixture was stirred under nitrogen atmosphere and temperature of 25° C. for 3 hours. The resulting reaction solution was subjected to suction filtration using a Kiriyama funnel lined with 5A filter paper. The resulting filtrate was diluted with ethyl acetate (110 g), and hexane (120 g) was added thereto to deposit the product. The deposit was subjected to suction filtration using 5A filter paper, and dried in vacuo to obtain methoxy polyethylene glycol having a terminal carboxyl group (0.55 g).

Content of polyethylene glycol having a weight average molecular weight of 5,000 in the resulting polyethylene glycol=98.1%

Polydispersity of the resulting polyethylene glycol=1.09

Carboxylation rate=94% by mole

Comparative Example 3

Methoxy polyethylene glycol having a terminal formyl group (5.0 g, $1.0 \times 10^{-3}$ mol, SUNBRIGHT ME-050AL produced by NOF Corp.) was dissolved in ion-exchanged water (7.5 g), to the resulting aqueous solution was added 30% aqueous hydrogen peroxide solution (0.23 g), and the mixture was stirred under nitrogen atmosphere and temperature of 100° C. for 4 hours. Then, 30% aqueous sodium ascorbate solution (1.3 g) was added to the reaction solution, the solution was stirred at 26° C. for 30 minutes or more, and then 85% aqueous phosphoric acid solution (0.23 g) was added thereto to adjust pH of the reaction solution to 3. Then, the product was extracted with chloroform (50 g) from the reaction solution. The resulting extract phase (chloroform solution) was concentrated at 40° C., and to the resulting concentrate was added ethyl acetate (25 g). To the resulting ethyl acetate solution was added magnesium sulfate (0.5 g), the mixture was stirred at 35° C. for 15 minutes, and then subjected to suction filtration using a Kiriyama funnel lined with 5A filter paper. To the resulting filtrate was added hexane (25 g) to deposit the product. The deposit was subjected to suction filtration using 5A filter paper and dried in vacuo to obtain methoxy polyethylene glycol having a terminal carboxyl group (3.9 g).

Content of polyethylene glycol having a weight average molecular weight of 5,000 in the resulting polyethylene glycol=unmeasurable Polydispersity of the resulting polyethylene glycol=1.35

Carboxylation rate=38% by mole

The polydispersity and carboxylation rate of the polyethylene glycols obtained in Examples 1 to 2 and Comparative Examples 1 to 3 are shown in Table 1 below. Further, the polydispersity and conversion rate were evaluated according to the criteria shown below. The evaluation results are also shown in Table 1 below.

Polydispersity
○ (good): 1.08 or less
× (bad): more than 1.08

Carboxylation Rate
○ (good): 85% by mole or more
× (poor): less than 85% by mole

TABLE 1

|  | Polydispersity | | Carboxylation Rate (% by mole) | |
|---|---|---|---|---|
| Example 1 | 1.05 | ○ | 95 | ○ |
| Example 2 | 1.06 | ○ | 91 | ○ |
| Comparative Example 1 | 1.09 | × | 78 | × |

TABLE 1-continued

|  | Polydispersity | | Carboxylation Rate (% by mole) | |
|---|---|---|---|---|
| Comparative Example 2 | 1.09 | X | 94 | ○ |
| Comparative Example 3 | 1.35 | X | 38 | X |

In Examples 1 and 2 which satisfy the requirement of the invention, the methoxy polyethylene glycols having a terminal carboxyl group, which had a good carboxylation rate and a small polydispersity were able to be produced. On the other hand, in Comparative Example 1, which corresponds to the production method described in Patent Document 2, the polyethylene glycol having a low carboxylation rate and a large polydispersity was obtained. Further, in Comparative Example 2 in which the oxidation had been performed in DMF, the polyethylene glycol having a large polydispersity was obtained. Moreover, in Comparative Example 3 in which an aqueous hydrogen peroxide solution had been used as the oxidizing agent, the polyethylene glycol having a low carboxylation rate and a large polydispersity was obtained.

While the invention has been described in detail and with reference to specific embodiments thereof, it will be apparent to those skilled in the art that various changes and modifications can be made therein without departing from the spirit and scope of the invention.

This application is based on a Japanese patent application filed on Nov. 20, 2015 (Japanese Patent Application No. 2015-227812), and the whole contents thereof are incorporated herein by reference. Also, all the references cited herein are incorporated as a whole.

The invention claimed is:

1. A method for producing polyethylene glycol having a terminal carboxyl group, comprising oxidizing polyethylene glycol represented by formula (I) with potassium peroxymonosulfate in water whose pH is adjusted to be from 6 to 8 with at least one selected from the group consisting of a carbonate, a phosphate, a citrate and an acetate at 5 to 40° C. to produce polyethylene glycol represented by formula (II):

$$CH_3O(CH_2CH_2O)_n(CH_2)_m\text{—}CHO \quad (I)$$

(in the formula, n is a number from 10 to 1,100, and m is 2 or 3);

$$CH_3O(CH_2CH_2O)_n(CH_2)_m\text{—}COOH \quad (II)$$

(in the formula, n and m have same meanings as defined above).

2. The production method as claimed in claim 1, wherein an amount of the potassium peroxymonosulfate is from 1.5 to 4 moles with respect to one mole of the polyethylene glycol represented by formula (I).

* * * * *